United States Patent [19]
Forsberg et al.

[11] Patent Number: 5,613,241
[45] Date of Patent: Mar. 18, 1997

[54] TREATMENT OF HALOGEN-CONTAINING WASTE AND OTHER WASTE MATERIALS

[75] Inventors: Charles W. Forsberg; Edward C. Beahm, both of Oak Ridge; George W. Parker, Concord, all of Tenn.

[73] Assignee: Lockheed Martin Energy Systems, Inc., Oak Ridge, Tenn.

[21] Appl. No.: 443,624

[22] Filed: May 18, 1995

Related U.S. Application Data

[63] Continuation-in-part of Ser. No. 230,156, Apr. 19, 1994, Pat. No. 5,461,185.

[51] Int. Cl.$^6$ ................................................. G21F 9/00
[52] U.S. Cl. ........................... 588/11; 588/201; 588/207; 501/152; 501/155; 976/DIG. 385; 976/DIG. 394
[58] Field of Search ............................ 588/11, 201, 207; 501/152, 155; 976/DIG. 385, DIG. 394

[56] References Cited

U.S. PATENT DOCUMENTS

| | | | |
|---|---|---|---|
| 3,365,578 | 1/1968 | Grover et al. | 250/106 |
| 4,097,401 | 6/1978 | Guber et al. | 252/301.1 |
| 4,314,909 | 2/1982 | Beall, et al. | 252/629 |
| 4,351,749 | 9/1982 | Ropp | 252/629 |
| 4,395,367 | 7/1993 | Rohrmann et al. | 252/629 |
| 4,404,129 | 9/1983 | Penberthy et al. | 252/629 |
| 4,464,294 | 8/1984 | Thiele | 252/629 |
| 4,497,782 | 2/1985 | Howell et al. | 423/184 |
| 4,602,574 | 7/1986 | Bach et al. | 110/235 |
| 4,847,008 | 7/1989 | Boatner et al. | 252/629 |
| 4,847,219 | 7/1989 | Boatner et al. | 501/27 |
| 5,098,645 | 3/1992 | Forsberg | 376/272 |
| 5,120,342 | 6/1992 | Richards | 65/178 |
| 5,202,100 | 4/1993 | Nagel et al. | 423/5 |
| 5,301,620 | 4/1994 | Nagel et al. | 110/250 |

FOREIGN PATENT DOCUMENTS 2484126  12/1981  France .

OTHER PUBLICATIONS

Abstract, Europe EP 71–927, Aug. 7, 1981.
Abstract, Japan J5 9044–699–A, Sep. 8, 1982.
Abstract, Japan J5 9127–000–A, Jan. 12, 1983.
Abstract, Japan J6 1250–596–A, Apr. 30, 1985.
Abstract, Japan J6 3241–400–A, Mar. 28, 1987.
Charles W. Forsberg, et al., "Direct Conversions of Plutonium Metal, Scrap, Residue, and Transfuranic Waste to Glass", Jan. 19, 1995, for Waste Management '95, Tucson, Arizona.
Charles W. Forsberg, "Single Waste Form Repository: Conversion of Miscellaneous Wastes to Glass", Jan. 10, 1995, for 1995 International High–Level Radioactive Waste Management Conference.

(List continued on next page.)

*Primary Examiner*—Ngoclan Mai
*Attorney, Agent, or Firm*—Andrew S. Neely; P. D. Guettner; H. W. Adams

[57] ABSTRACT

A process for treating a halogen-containing waste material. The process provides a bath of molten glass containing a sacrificial metal oxide capable of reacting with a halogen in the waste material. The sacrificial metal oxide is present in the molten glass in at least a stoichiometric amount with respect to the halogen in the waste material. The waste material is introduced into the bath of molten glass to cause a reaction between the halogen in the waste material and the sacrificial metal oxide to yield a metal halide. The metal halide is a gas at the temperature of the molten glass. The gaseous metal halide is separated from the molten glass and contacted with an aqueous scrubber solution of an alkali metal hydroxide to yield a metal hydroxide or metal oxide-containing precipitate and a soluble alkali metal halide. The precipitate is then separated from the aqueous scrubber solution. The molten glass containing the treated waste material is removed from the bath as a waste glass. The process of the invention can be used to treat all types of waste material including radioactive wastes. The process is particularly suited for separating halogens from halogen-containing wastes.

20 Claims, 3 Drawing Sheets

OTHER PUBLICATIONS

Charles W. Forsberg, et al., "Direct Conversion of Radioactive and Chemical Waste Containing Metals, Ceramics, Amorphous Solids, and Organics to Glass", May 16, 1994, for Spectrum '94 Nuclear and Hazardous Waste Management International Topical Meeting.

Charles W. Forsberg, et al., "Direct Conversion of spent Fuel to High–Level–Waste (HLW) Glass", Sep. 28, 1994, for American Nuclear Society Conference DOE Spent Nuclear Fuel: Challenges and Initiatives Session: Processing and Conditioning Options, Salt Lake City, Utah.

TREATMENT OF HALOGEN-CONTAINING WASTE AND OTHER WASTE MATERIALS

This invention was made with Government support under Contract DE-AC05-84OR21400 awarded by the U.S. Department of Energy to Martin Marietta Energy Systems, Inc., and the Government has certain rights to this invention.

CONTINUING DATA

This application is a continuation-in-part of U.S. patent application Ser. No. 08/230,156 filed Apr. 19, 1994, U.S. Pat. No. 5,461,185 which is incorporated herein by reference.

FIELD OF THE INVENTION

The present invention relates to the treatment of halogen-containing wastes and other waste materials. More particularly, the invention relates to a process for treating halogenated waste materials by introducing the waste materials into a bath of molten glass containing a sacrificial metal oxide.

BACKGROUND OF THE INVENTION

Many industrial waste materials, such as radioactive wastes, chemically hazardous wastes, or toxic elemental wastes, present difficult disposal problems due to the hazard of the material and the intensely regulated nature of these materials. When halogens are contained within such waste material, the halogens create unique problems, which are not adequately addressed by conventional treatment methods.

Sources of halogen-containing waste include, not only processes that create halide salts or halogens-containing compounds, but also wastes contaminated by radioactive or other hazardous materials. A chloride salt purification process used to process plutonium in a weapons complex is one example of a process generating halogen-containing waste. That process generates large quantities of chloride-containing radioactive wastes. Halogen-containing plastics, used as components of radioactive or chemically hazardous wastes streams or equipment are another example of halogen-containing wastes. These also require treatment for such disposal.

Halogen-containing compounds are also used to create chemically resistant or fireproof manufactured goods which also present unique disposal problems. Examples include many plastics, such as Hypalon® plastic, a product of Dupont, Wilmington, Del., which are used to insulate electrical wire. Hypalon® plastic also contains valuable lead oxide that should be recovered both for recycling and to avoid long-term problems with the toxicity of the lead. In other cases, plastic within a waste material must be destroyed to recover copper and other valuable materials. Thus, a problem with many halogen-containing waste materials is that they were originally designed with great care not to burn or be damaged by chemicals. Though very desirable in a manufactured product, these properties cause difficulties in the treatment and disposal of such materials.

With their water solubility, another significant problem with many halogen-containing wastes and waste forms (e.g. salts) is leaching and groundwater contamination. If a high quality waste form is to be made, the halogens should be removed from the waste before or during conversion to a waste form used for disposal.

SUMMARY OF THE INVENTION

The present invention addresses problems existing with the treatment of halogen-containing waste materials as well as other waste materials.

Importantly, the present invention separates halogens from a waste material being treated, such as radioactive and hazardous wastes, and, thus, allows production of a non-halogen, high durability waste form. High concentrations of halogens in wastes imply low performance by the final waste disposal form.

A second important feature of the invention is its ability to recycle reagents from the waste material treatment process. This is important to both minimize costs and avoid creating other hazardous wastes.

Third, the present invention may be used to treat and/or destroy wastes made from materials designed to be difficult to destroy.

Accordingly, in one embodiment, the present invention provides a process for treating a halogen-containing waste material. This process comprises the steps of:

providing a bath of molten glass containing a sacrificial metal oxide capable of reacting with a halogen in the waste material, where the sacrificial metal oxide is present in at least a stoichiometric amount with respect to the halogen in the waste material;

introducing the waste material into the bath of molten glass to cause a reaction between the halogen in the waste material and the sacrificial metal oxide to yield a metal halide which is a gas at the temperature of the molten glass;

separating the gaseous metal halide from the molten glass;

contacting the gaseous metal halide with an aqueous scrubber solution of an alkali metal hydroxide to yield a metal-containing precipitate and a soluble alkali metal halide;

separating the precipitate from the aqueous scrubber solution; and removing the molten glass containing the treated waste material as a waste glass.

In another embodiment, the present invention provides a process for the conversion of waste material containing halogen-containing compounds, elemental metal or carbon-containing compounds. This process comprises the steps of:

providing a bath of molten glass containing at least one sacrificial metal oxide, where at least one sacrificial metal oxide is capable of reacting with a halogen in the waste material, or of oxidizing elemental metal or carbon-containing compounds within the waste material, and the sacrificial metal oxide is present in at least a stoichiometric amount for the reaction or the oxidation;

introducing the waste material into the bath of molten glass to cause a reaction between the waste material and the sacrificial metal oxide, wherein at least one sacrificial metal oxide reacts with a halogen in the waste material to yield a metal halide which is a gas at the temperature of the molten glass and at least one sacrificial metal oxide oxidizes elemental metal to form an oxide of the elemental metal which is soluble in the molten glass or oxidizes the carbon-containing compound thereby reducing the sacrificial metal oxide to its elemental metal;

separating the gaseous metal halide from the molten glass;

contacting the gaseous metal halide with an aqueous scrubber solution of an alkali metal hydroxide to yield a metal-containing precipitate and a soluble alkali metal halide; separating the precipitate from the aqueous scrubber solution;

removing the molten glass containing the treated waste material as a waste glass; and recovering the elemental metal derived from the sacrificial metal oxide from the bath.

DETAILED DESCRIPTION OF THE INVENTION

The invention is an improvement of a Glass Material Oxidation and Dissolution System (GMODS) such as disclosed in copending U.S. patent application Ser. No. 08/230,156, which is incorporated herein by reference. GMODS has also been described in the following publications:

Charles W. Forsberg, et al., "Direct Conversion of Plutonium Metal, Scrap, Residue, and Transfuranic Waste to Glass", Jan. 19, 1995, for Waste Management '95, Tucson, Ariz.

Charles W. Forsberg, "Single Waste Form Repository: Conversion of Miscellaneous Wastes to Glass", Jan. 10, 1995, for 1995 International High-Level Radioactive Waste Management Conference.

Charles W. Forsberg, et al., "Direct Conversion of Radioactive and Chemical Waste Containing Metals, Ceramics, Amorphous Solids, and Organics to Glass", May 16, 1994, for Spectrum '94 Nuclear and Hazardous Waste Management International Topical Meeting.

Charles W. Forsberg, et al., "Direct Conversion of spent Fuel to High-level-Waste (HLW) Glass", September 28, 1994 for American Nuclear Society Conference DOE Spent Nuclear Fuel: Challenges and Initiatives Session: Processing and Conditioning Options, Salt Lake City, Utah.

The present inventions allows GMODS to efficiently process halogen-containing wastes by removing the halogens from the waste, and converting the remaining waste to oxide glass waste forms.

As a first embodiment, the present invention provides a process for treating a halogen-containing waste material. The process provides a bath of molten glass containing a sacrificial metal oxide capable of reacting with a halogen in the waste material. The sacrificial metal oxide is present in the bath in at least a stoichiometric amount with respect to the halogen in the waste material. The waste material is then introduced into the bath of molten glass to cause a reaction between the halogen in the waste material and the sacrificial metal oxide. This reaction yields a metal halide which is a gas at the temperature of the molten glass. The resultant gaseous metal halide is separated from the molten glass and contacted with an aqueous solution of an alkali metal hydroxide to yield a metal-containing precipitate and a soluble alkali metal halide. The precipitate is then separated from the aqueous solution. The molten glass containing the treated waste material is removed as a waste glass. A process of the invention may be practiced as a batch, semi-batch or continuous process. Each of the above steps are described in more detail below.

To describe the various embodiments of this invention, the chemical equations and below text uses chlorine as an example. The other halogens, fluorine, chlorine, bromine, and iodine, have parallel behavior. Thus, the present invention is applicable to all halogen-containing waste materials.

As is known in the art, the bath of molten glass provided according to the invention is contained within a glass melter. A cold-walled, induction-heated glass melter is preferred. The particular glass forming materials employed in the bath may vary considerably. Preferably, one or more of the sacrificial metal oxide, any oxides in the halogen-containing waste material, or oxides produced from the reaction of the waste material and the sacrificial metal oxide will be soluble in the glass employed.

The term "glass" is used in a generic sense, and includes, but is not limited to, lead borate glasses, bismuth borate, borosilicate glasses, silica glasses, glass-ceramics, e.g., as described in U.S. Pat. No. 4,314,909 and U.S. Pat. No. 4,464,294, and polymeric aluminum phosphate glasses, and mixtures thereof. Lead borate glasses, bismuth borate glasses, and borosilicate glasses, such as sodium borosilicate, are preferred for this invention.

As described above, a process of the invention provides a bath of molten glass containing a sacrificial metal oxide. The molten glass contains sufficient sacrificial metal oxide to react with the amount of halogen in the waste material. That is, the sacrificial metal oxide is present in the bath in at least a stoichiometric amount with respect to the amount of halogen in the waste material and preferably in excess of that amount. The sacrificial metal oxide is capable of reacting with a halogen in the waste material to yield a metal halide having a sufficient vapor pressure at the temperature of the molten glass such that the metal halide may be removed in an offgas. Thus, the reaction between the sacrificial metal oxide and the halogen-containing waste material in the molten glass yields a gaseous metal halide product which can be separated from the molten glass.

Metal oxides which can serve as the sacrificial metal oxide in the process of the invention include, but are not limited to, lead oxide, PbO; and bismuth oxide, $Bi_2O_3$. Table 1 lists various compounds of lead, bismuth, and sodium and some of their properties relevant to this discussion and the invention.

TABLE 1[1]

| COMPOUND | BOILING POINT DEGREES °C. | SOLUBILITY[2] G/100 g WATER |
| --- | --- | --- |
| $PbF_2$ | 1290 | 0.064 |
| $PbCl_2$ | 950 | 0.99 |
| $PbBr_2$ | 918 | 0.84 |
| $PbI_2$ | 954 | 0.063 |
| Pb | 1751 | Insoluble |
| $Pb(OH)_2$ | [3] | 0.0155 |
| $BiF_3$ | 1027 | Insoluble |
| $BiCl_3$ | 447 | [4] |
| $BiBr_3$ | 460 | [5] |
| $BiI_3$ | 439 | Insoluble |
| Bi | 1450 | Insoluble |
| $Bi(OH)_3$ | Loses $H_2O$ at 100 | 0.00014 |
| NaF | 1704 | 4.0 |
| NaCl | 1473 | 35.7 |
| NaBr | 1390 | 90.0 |
| NaI | 1300 | 158.7 |
| NaOH | 1390 | 108.0 |

[1]Lange's Handbook of Chemistry, Eleventh Edition
[2]Solubility at 20° C.
[3]Decompose to PbO and $H_2O$ at 145° C.
[4]Converts to insoluble BiOCl
[5]Converts to insoluble BiOBr The sacrificial metal oxide may be added to the molten gas as a separate component or be a component of the glass itself. Preferably, the glass is a lead borate glass or a bismuth borate glass where the lead oxide or the bismuth oxide component of the glass functions as the sacrificial metal oxide. In the lead borate glass, an initial 2 to 1 molar ratio of lead oxide to boron oxide is preferred. In the bismuth borate glass, an initial 2 to 1 molar ratio of bismuth oxide to boron oxide is preferred.

Figure 1:
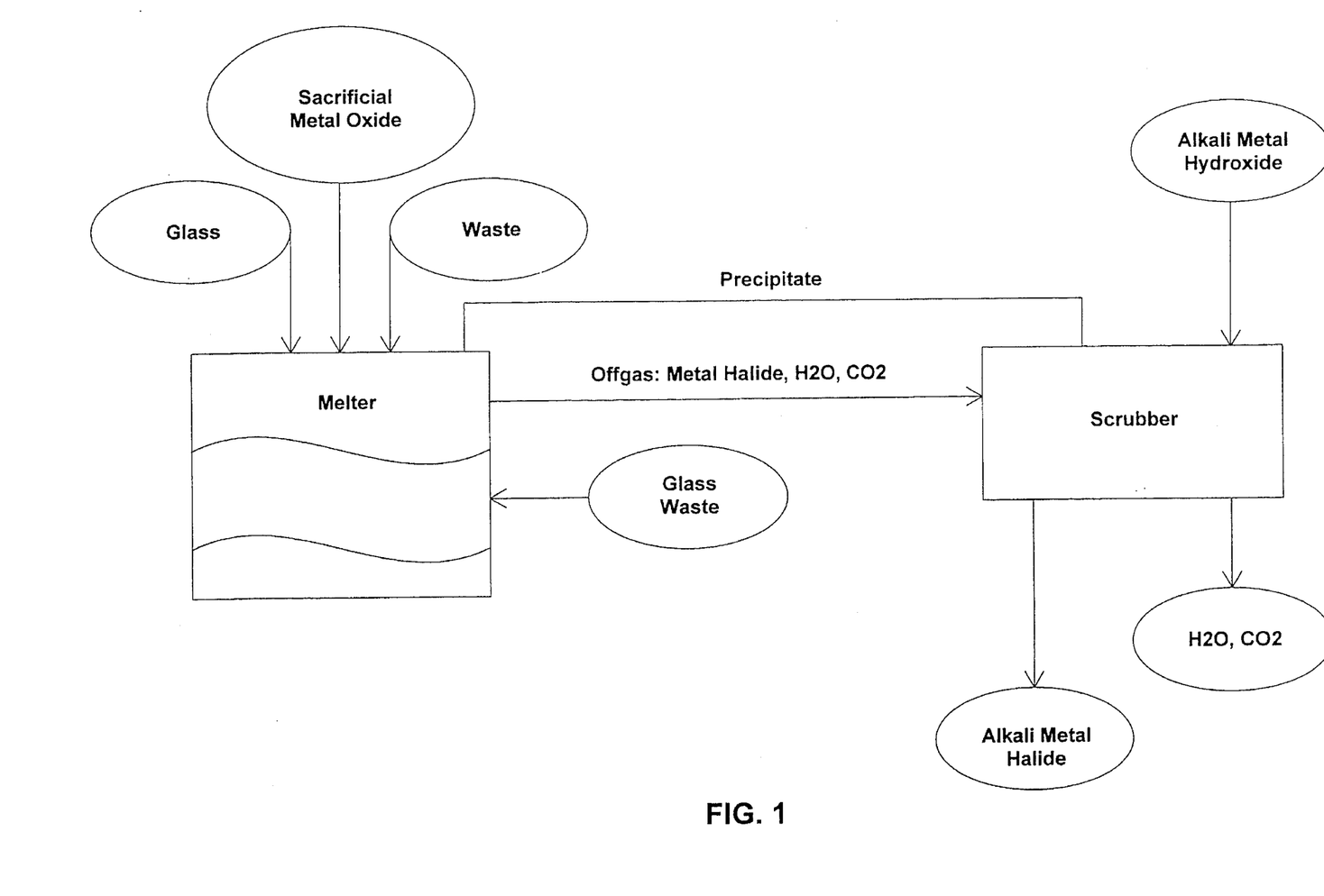
FIGS. 1–3 depict various embodiments of the process for the treatment of waste materials according to the present invention.

As shown in FIG. 1, the halogen-containing waste is introduced into the bath of molten glass containing the sacrificial metal oxide. One of ordinary skill would appreciate that actual operating temperatures for the bath of molten glass will depend on the materials in the glass. In general, and for the preferred lead borate glass, the glass melter typically operates at temperatures of 800°–1400° C. The molten glass dissolves any ceramic and amorphous solid waste components introduced.

The temperature of the molten glass and the presence of the sacrificial metal oxide causes chemical compounds fed to the melter to undergo reactions and/or be destroyed. With halogen-containing wastes, the halogen present reacts with the sacrificial metal oxide to form metal halide in the molten glass. In a process of the invention, the resulting metal halide is volatile and exists as a gas at the temperature of the molten glass.

For example, where the halogen is chlorine, the preferred lead-borate glass has a high lead oxide content that allows the formation of lead chloride ($PbCl_2$) within the molten glass. Thus, in a preferred process, chlorine exits the melter as lead chloride ($PbCl_2$). Similarly, where bismuth oxide is the sacrificial metal oxide, the chlorine would react with the bismuth oxide to form bismuth chloride ($BiCl_3$) and exits as gaseous bismuth chloride. Table 1, above, shows the boiling points of different lead and bismuth halogen compounds. As can be seen from Table 1 above, the boiling points of the lead halides and the bismuth halides allows their separation and removal from the molten glass containing the other waste components.

According to a process of the invention, the gaseous metal halide is separated from the molten glass. Preferably, as shown in FIG. 1, the metal halide exits the glass melter as a gas in the offgas system. The offgas contains other volatile byproducts from the waste treatment process such as carbon dioxide ($CO_2$) and steam ($H_2O$).

As depicted in FIG. 1, the gaseous metal halide, preferably as a component of the melter offgas, is contacted with an aqueous scrubber solution containing an alkali metal hydroxide. The alkali metal hydroxide, preferably sodium hydroxide or potassium hydroxide, reacts with the metal halide to yield a metal-containing precipitate (for example, a metal hydroxide, metal oxide, or metal oxyhalide precipitate) and a soluble alkali metal halide. Preferably, the scrubber solution removes not only the metal halide but also any other particles, volatiles, glass aerosols, etc. present in the offgas.

The reactions for the metal halides from the preferred lead and bismuth sacrificial metal oxides, with the alkaline metal spectator cations removed, are:

The $PbCl_2$ reaction has a large equilibrium constant of $4\times10^{11}$ at 25° C. This indicates that the products $Pb(OH)_2$ and $Cl^-$ are strongly favored in an alkaline solution. Analogously, $Bi(OH)_3$ and $Cl^-$ are also favored.

Tables 1 shows the solubility of the various compounds in water. As is known in the art, alkali metal hydroxides and alkali metal halides are extremely soluble in water. Lead chloride and bismuth chloride are also soluble in water. The lead hydroxide and bismuth hydroxide are insoluble and, thus, precipitate out of the aqueous scrubber solution.

The metal-containing precipitate (for example, metal hydroxide, metal oxide, or metal oxyhalide precipitates), and any other precipitates found in or resulting from the scrubber solution, can then be separated from the aqueous scrubber solution by means known in the art. Preferably, the separation is accomplished by filtration. The precipitates may also be allowed to settle from the solution or undergo centrifugation. This solids-liquid separation in the scrubber may also separate aerosols scrubbed by the aqueous solution.

After separation from the precipitates, the scrubber solution containing a metal halide, such as sodium chloride, is disposed of as a nonhazardous salt waste or can be dried and used as road salt. Thus, the halogen exits the system separate from the halogen-containing waste with which it entered the process.

The sodium chloride solution, before disposal or reuse, may require treatment by an adsorbent to remove low levels of hazardous materials, such as lead, and other materials remaining in the solution from the offgas. For example, standard industrial processes used to treat drinking water may be employed to assure low lead levels. One common adsorbent is charcoal that can be disposed of as a waste, preferably by recycling back to the bath of molten glass.

As shown in FIG. 1, the precipitate separated from the aqueous scrubber solution is preferably recycled back to the bath of molten glass. Preferably, the metal hydroxide will decompose at the temperature of the molten glass to yield the corresponding metal oxide and water. In the case of lead hydroxide or bismuth hydroxide, the lead oxide or bismuth oxide generated by the decomposition reaction reenters the process and becomes available for use as the sacrificial metal oxide.

Any other precipitates from the scrubber solution may also be recycled back to the molten glass with the metal hydroxide and end up in the final glass waste. This ensures full treatment and disposal of the halogen-containing waste material.

As a final step in a process of the invention, the molten glass mixture containing treated waste materials may be removed from the bath as a waste glass or treated further for disposal and/or recovery of other components. The further treatment of the molten waste glass is discussed below.

Halogen-containing components may not be the only components of concern in the waste material being treated. Advantageously, a process of the invention may also be used to treat a variety of waste materials such as radioactive wastes or hazardous carbon-containing waste materials.

A process of the invention may be used, therefore, to convert radioactive waste, particularly spent nuclear fuel and its cladding, if any, into a solidified waste glass. "Radioactive waste" not only includes radioactive material per se which requires disposal, but also miscellaneous attendant materials, such as metal and/or carbon assemblies or cladding, ceramics, amorphous solids, and organic solids, including various polymeric materials. As indicated, the spectrum of radioactive waste which may be processed by the invention is extensive, and will include, but is not limited to, miscellaneous spent nuclear fuels, hot cell waste, high level waste, laboratory waste, filters, low level waste, etc. In terms of radioactivity level, the level of the final disposable waste glass produced by a process of the invention depends on the character of the initial waste.

Radioactive materials containing plutonium may also be treated by a process of this invention. The chemical purification of weapons grade plutonium and production of plutonium metal have used various halogen salts. Such processes create both plutonium-containing and halogen-containing waste as well as other plutonium residues with significant concentrations of halogens. These wastes and residues must be converted to halogen-free forms acceptable for disposal. With the end of the cold war, plutonium will not be purified and fabricated into new weapons. Rather, it must be stored safely. This requires conversion of halogen-containing plutonium into a stable, non-corrosive form for storage. Plutonium-containing chemical forms which also contain halogens accelerate corrosion of storage containers and create other storage problems. One acceptable form would be glass without halogens such as may be made using a process of the invention.

Hazardous carbon-containing waste materials may also be treated using a process of the invention. These waste materials may or may not contain an oxidizable metal, but generally contain carbon in an oxidizable form. Such wastes include, but are not limited to, organic chemicals in general, chemical waste streams, wastes from environmental cleanups, oxide-containing nuclear reactor wastes with carbon assemblies, as well as wastes which contain or comprise carbon in forms such as SiC or graphite.

Figure 2:
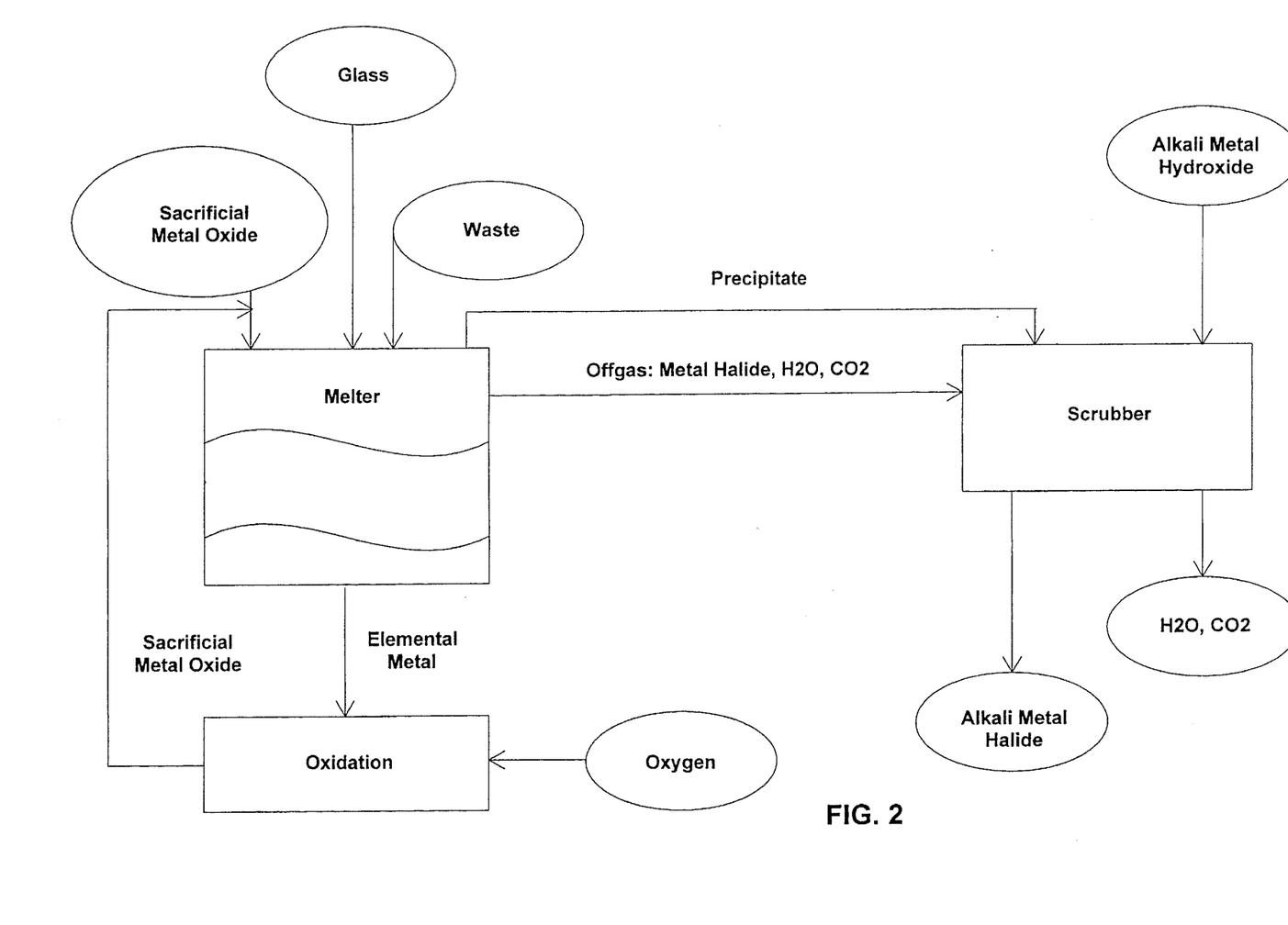
Figure 3:
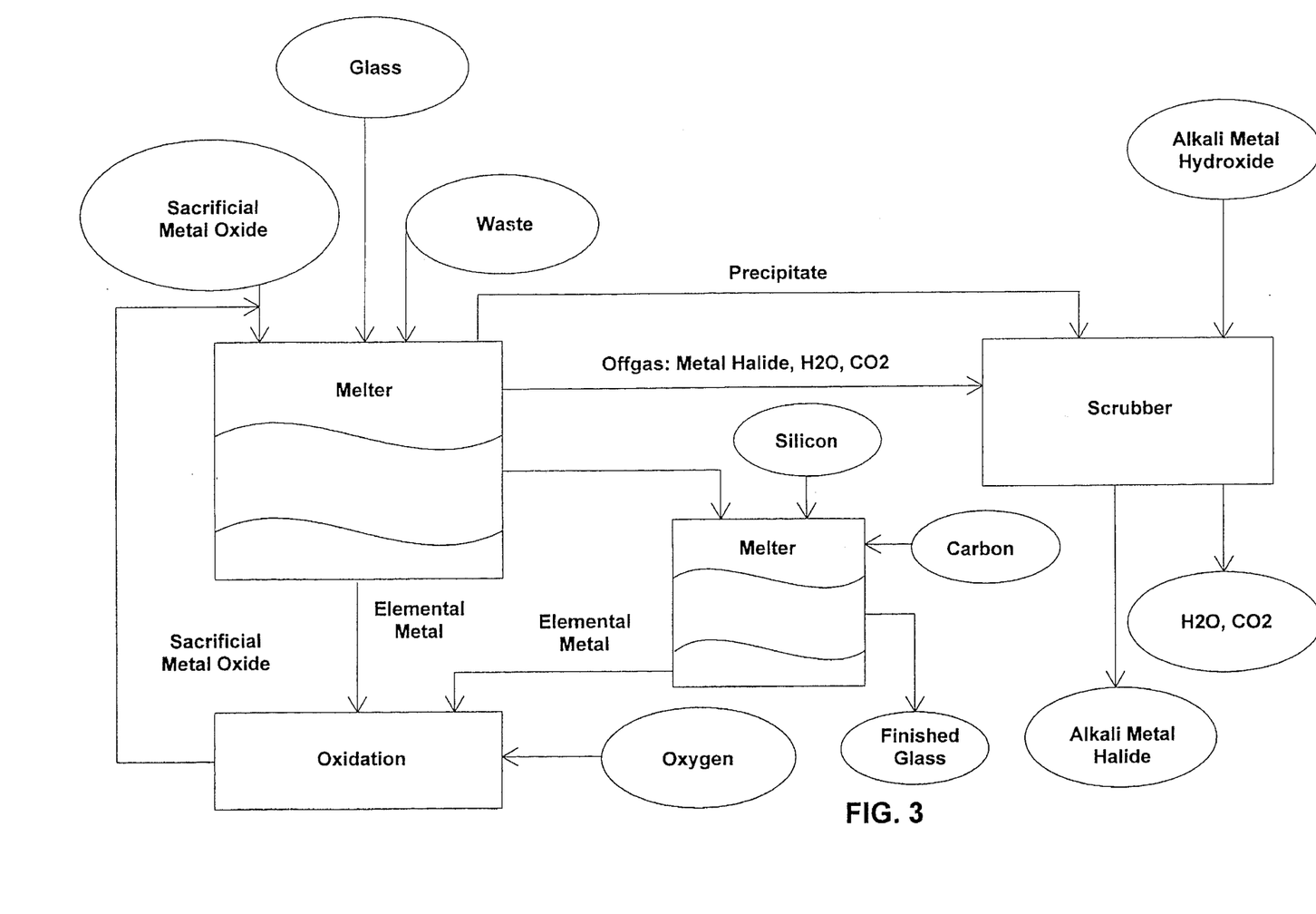

Accordingly, another embodiment of the invention is a process for the conversion of waste material containing halogen-containing compounds, elemental metal and carbon-containing compounds. This process, with various preferred aspects, is shown in FIGS. 2 and 3.

As with the process described above, this process provides a bath of molten glass containing at least one sacrificial metal oxide. At least one sacrificial metal oxide present in the molten glass is capable of reacting with a halogen in the waste material, or of oxidizing elemental metal or carbon-containing compounds within the waste material. The sacrificial metal oxide is present in at least a stoichiometric amount for the reaction or the oxidation. The waste material is introduced into the bath of molten glass to cause a reaction between the waste material and the sacrificial metal oxide. At least one sacrificial metal oxide reacts with a halogen in the waste material to yield a metal halide which is a gas at the temperature of the molten glass. And, at least one sacrificial metal oxide oxidizes elemental metal to form an oxide of the elemental metal which is soluble in the molten glass or oxidizes the carbon-containing compound thereby reducing the sacrificial metal oxide to its elemental metal. The gaseous metal halide is separated from the molten glass and contacted with an aqueous scrubber solution of an alkali metal hydroxide to yield a metal-containing precipitate and a soluble alkali metal halide. The precipitate is then separated from the aqueous scrubber solution. The molten glass containing the treated waste material is removed as a waste glass. The elemental metal derived from the sacrificial metal oxide is also recovered from the bath.

The common process steps of this embodiment and those described above are carried out in the same manner as described above and may have the same preferred embodiments or additional steps. In view of that discussion, various aspects of the process of the second embodiment are described below.

Where waste materials contain oxidizable metals or carbon-containing compounds (e.g. organic compounds), the bath of molten glass contains at least one sacrificial metal oxide is capable of oxidizing the metal or carbon-containing compounds within the waste material. The sacrificial metal oxide is present in at least a stoichiometric amount for the oxidation and preferably in excess.

As with the halogen-containing waste materials, elemental metal, radioactive, or carbon-containing waste materials are introduced into the molten glass bath. The waste materials or its components are dissolved or oxidized by the sacrificial metal oxide. Waste components which are oxides generally dissolve in the bath directly.

Under the conditions of the bath, the sacrificial metal oxide oxidizes the oxidizable metal in the waste materials to metal oxides which dissolve in the molten glass. The sacrificial metal oxide also oxidizes the carbon-containing compounds to carbon dioxide and water (steam). The carbon dioxide and steam separate easily from the molten glass as a component of the offgas which is treated as discussed above.

In these oxidation reactions, the sacrificial metal oxide itself undergoes reduction to either its elemental metal or a reduced metal oxide. Preferably, the elemental metal derived from the sacrificial metal oxide is a solid or molten byproduct elemental metal having limited solubility in the molten glass at the temperature of the bath. The elemental metal derived from the sacrificial metal oxide, therefore, preferably sinks to the bottom of the bath. Where the sacrificial metal oxide is reduced to a reduced metal oxide, the reduced metal oxide is preferably soluble in the molten glass.

For example, when the sacrificial metal oxide is lead oxide, typical chemical reactions occurring in the molten glass may include:

$$2PbO + C \rightarrow 2Pb + CO_2$$

$$3PbO + 2Al \rightarrow 3Pb + Al_2O_3$$

$$4PbO + 3Fe \rightarrow 4Pb + Fe_3O_4$$

Similar reactions occur for bismuth oxide, the other preferred sacrificial metal oxide.

After the waste material is introduced into the molten glass, the solid or molten elemental metal derived from the sacrificial metal oxide is recovered from the bath using means known in the art.

As shown in FIGS. 2 and 3, the recovered elemental metal may be reoxidized using means known in the art in a separate process step back to the sacrificial metal oxide. The reoxidation is preferably accomplished using air or oxygen. The sacrificial metal oxide may then be reintroduced into the molten glass to process additional waste. This recycling of the elemental metal derived from the sacrificial metal oxide is particularly advantageous in a preferred embodiment where the glass is a lead-borate glass and the sacrificial metal oxide is lead oxide. The oxidation of the lead metal to lead oxide may be accomplished by standard industrial processes such as used in the manufacture of lead batteries and in other industries. Bismuth may be reoxidized to bismuth oxide using analogous processes as is known in the art.

In a preferred embodiment, recycled sacrificial metal oxide may be continuously added to the bath of molten glass while introducing a waste material into the bath (FIGS. 2 and 3). For any particular waste, there will be an optimum sacrificial metal oxide-glass composition. In the preferred lead-borate glass composition, this refers to the optimum ratio of lead oxide to borate (PbO to $B_2O_3$) in the glass. The process of the invention consumes sacrificial metal oxide resulting in continual changes in the actual ratio of sacrificial metal oxide to glass, for example, PbO to $B_2O_3$ in lead borate glass. The optimum ratio or amount of sacrificial metal oxide can be maintained by continuous addition or recycling of the sacrificial metal oxide to the melter during waste material introduction.

In a process of the invention, the molten glass mixture containing treated waste materials may be removed from the bath as a waste glass or treated further for disposal and/or recovery of other components. The further treatment may be accomplished by means known in the art. A preferred method is discussed below and shown in FIG. 2.

If the molten glass mixture contains radioactive materials, it must be treated as waste. In this case, the molten glass containing the treated waste material (or waste glass) removed from the bath can be converted to a glass, preferably a borosilicate glass. This conversion is preferably carried out in a second melter as shown in FIG. 3. Any offgases from this conversion may be sent to the aqueous scrubber solution and processed as described above.

Any excess sacrificial metal oxide can be removed from the molten waste glass by addition of carbon. This results in sacrificial metal oxide being converted to its corresponding elemental metal, and sinking to the bottom of the melter, having limited solubility in the molten glass. The elemental metal may then be recovered, oxidized back to its sacrificial metal oxide and reintroduced into the molten glass to treat additional waste materials as described above. The sacrificial metal oxide may be removed from the molten waste glass for several reasons: to avoid the need to buy added chemical reagent to process additional waste, to reduce volume of final waste, or to produce a higher quality final waste form.

As is known in the art, silica (sand) and several other components may be added to the molten waste glass to create a durable waste silicate glass, preferably a borosilicate glass. Because of its excellent properties for encapsulating hazardous materials, borosilicate glass is currently used to solidify highly hazardous waste, such as highly radioactive waste.

When treating radioactive waste containing plutonium, the resulting plutonium oxide is, preferably and advantageously, diluted in the finished glass by the presence or addition of other waste, such as spent fuel and cladding, to the molten glass bath. Preferably, in such cases, the "diluent" is selected from nuclear reactor spent fuels, e.g., navy reactor spent fuel, breeder reactor fuels, and light-water reactor fuels.

If the waste material treated was hazardous because of its organic components or halogen-containing components, the process of the invention will have destroyed the hazard of the waste. In this case, the sacrificial metal oxide, preferably lead oxide or bismuth oxide, may also be recovered and recycled in the process as described above. The resultant boron oxide melt may also be leached for the recovery of boron using techniques known in the art and the boron recycled back to the bath of molten glass. The choice of the particular recovery process will depend upon the specific composition of the initial waste.

What is claimed is:

1. A process for treating a halogen-containing waste material comprising the steps of:

providing a bath of molten glass containing a sacrificial metal oxide capable of reacting with a halogen in the waste material, wherein the sacrificial metal oxide is present in at least a stoichiometric amount with respect to the halogen in the waste material;

introducing the waste material into the bath of molten glass to cause a reaction between the halogen in the waste material and the sacrificial metal oxide to yield a metal halide which is a gas at the temperature of the molten glass;

separating the gaseous metal halide from the molten glass;

contacting the gaseous metal halide with an aqueous scrubber solution of an alkali metal hydroxide to yield a metal-containing precipitate and a soluble alkali metal halide;

separating the precipitate from the aqueous scrubber solution; and removing the molten glass containing the treated waste material as a waste glass.

2. A process of claim 1, wherein the molten glass is a molten lead borate glass having a temperature between 800°–1400° C. and the sacrificial metal oxide is PbO.

3. A process of claim 2, wherein the halogen-containing waste material is radioactive waste.

4. A process of claim 2, further comprising the step of reintroducing the separated precipitate to the molten glass.

5. A process of claim 1, wherein the molten glass is a molten bismuth borate glass having a temperature between 800°–1400° C. and the sacrificial metal oxide is $Bi_2O_3$.

6. A process of claim 5, wherein the halogen-containing waste material is radioactive waste.

7. A process of claim 5, further comprising the step of reintroducing the separated precipitate to the molten glass.

8. A process for the conversion of waste material containing halogen-containing compounds and elemental metal or carbon-containing compounds comprising the steps of:

providing a bath of molten glass containing at least one sacrificial metal oxide, wherein at least one sacrificial metal oxide is capable of reacting with a halogen in the waste material, or of oxidizing elemental metal or carbon-containing compounds within the waste material, and the sacrificial metal oxide is present in at least a stoichiometric amount for the reaction or the oxidation;

introducing the waste material into the bath of molten glass to cause a reaction between the waste material and the sacrificial metal oxide, wherein at least one sacrificial metal oxide reacts with a halogen in the waste material to yield a metal halide which is a gas at the temperature of the molten glass and at least one sacrificial metal oxide oxidizes elemental metal to form an oxide of the elemental metal which is soluble in the molten glass or oxidizes the carbon-containing compound thereby reducing the sacrificial metal oxide to its elemental metal;

separating the gaseous metal halide from the molten glass;

contacting the gaseous metal halide with an aqueous scrubber solution of an alkali metal hydroxide to yield a metal-containing precipitate and a soluble alkali metal halide;

separating the precipitate from the aqueous scrubber solution;

removing the molten glass containing the treated waste material as a waste glass; and recovering the elemental metal derived from the sacrificial metal oxide from the bath.

9. A process of claim 8, wherein the molten glass is a molten lead borate glass having a temperature between 800°–1400° C. and the sacrificial metal oxide is PbO.

10. A process of claim 8, wherein the halogen-containing waste material is radioactive waste.

11. A process of claim 8, wherein the molten glass is a molten bismuth borate glass having a temperature between 800°–1400° C. and the sacrificial metal oxide is $Bi_2O_3$.

12. A process of claim 11, wherein the halogen-containing waste material is radioactive waste.

13. A process of claim 8, further comprising the steps of:

oxidizing the recovered elemental metal derived from the sacrificial metal oxide; and reintroducing the oxidized recovered elemental metal into the molten glass.

14. A process of claim 13, further comprising the step of reintroducing the separated precipitate to the molten glass.

15. A process of claim 8, further comprising the steps of:

adding carbon to the molten waste glass containing the treated waste material to reduce any remaining sacrificial metal oxide to its elemental metal;

recovering the elemental metal derived from the sacrificial metal oxide;

oxidizing the recovered elemental metal derived from the sacrificial metal oxide; and recycling the oxidized recovered elemental metal into the bath of molten glass containing the sacrificial metal oxide.

16. A process of claim 15, further comprising the step of reintroducing the separated precipitate to the molten glass.

17. A process of claim 15, wherein the molten glass is a molten lead borate glass having a temperature between 800°–1400° C. and the sacrificial metal oxide is PbO.

18. A process of claim 17, wherein the halogen-containing waste material is radioactive waste.

19. A process of claim 15, wherein the molten glass is a molten bismuth borate glass having a temperature between 800°–1400° C. and the sacrificial metal oxide is $Bi_2O_3$.

20. A process of claim 19, wherein the halogen-containing waste material is radioactive waste.

* * * * *